United States Patent
Huber

(10) Patent No.: US 8,147,177 B2
(45) Date of Patent: Apr. 3, 2012

(54) APPARATUS AND METHOD FOR ECONOMICALLY FORMING LAYERS OF PACKING UNITS

(75) Inventor: Wolfgang Huber, Grafing (DE)

(73) Assignee: Krones AG, Neutraubling (DE)

( * ) Notice: Subject to any disclaimer, the term of this patent is extended or adjusted under 35 U.S.C. 154(b) by 359 days.

(21) Appl. No.: 12/584,587

(22) Filed: Sep. 8, 2009

(65) Prior Publication Data

US 2010/0083622 A1  Apr. 8, 2010

(30) Foreign Application Priority Data

Oct. 2, 2008  (DE) .......................... 10 2008 050 395

(51) Int. Cl.
*B65G 57/26* (2006.01)
*B65G 47/32* (2006.01)
*B65G 47/90* (2006.01)

(52) U.S. Cl. ............... 414/791.4; 198/461.1; 414/791.8; 414/792.9

(58) Field of Classification Search ............... 198/379, 198/411, 418.3, 418.4, 459.1, 461.1, 470.1, 198/597; 414/788, 788.4, 788.6, 789.3, 789.4, 414/789.8, 789.9, 791, 791.2, 791.6, 792.2, 414/792.3, 792.4, 792.6, 792.7, 792.8, 792.9, 414/793, 799, 931; 53/244, 475; 700/213, 700/217
See application file for complete search history.

(56) References Cited

U.S. PATENT DOCUMENTS

| 3,442,400 | A | * | 5/1969 | Roth et al. ................. 414/789.9 |
| 3,587,876 | A | * | 6/1971 | Dahlem ..................... 414/789.1 |
| 3,667,622 | A | * | 6/1972 | Kamphues et al. ........ 414/791.4 |
| 4,641,271 | A | * | 2/1987 | Konishi et al. ................ 700/217 |
| 2004/0223839 | A1 | * | 11/2004 | Simkowski ................ 414/791.6 |
| 2005/0246056 | A1 | | 11/2005 | Marks et al. ................. 700/213 |
| 2008/0025834 | A1 | * | 1/2008 | Ponti et al. ..................... 414/799 |

FOREIGN PATENT DOCUMENTS

| CA | 2184774 | | 3/1997 |
| DE | 82 06 793 | U1 | 3/1985 |
| DE | 102 19 129 | A1 | 11/2003 |
| DE | 20 2005 015 887 | | 5/2006 |
| EP | 1 046 598 | A1 | 10/2000 |
| EP | 1223121 | A1 * | 7/2002 |
| EP | 0 761 578 | B1 | 5/2003 |
| EP | 1 456 101 | B1 | 6/2003 |
| EP | 1 767 474 | A2 | 3/2007 |

OTHER PUBLICATIONS

Brief translation of DE 82 06 793 U1, 1 page, Date: Mar . 28, 1985.

* cited by examiner

*Primary Examiner* — Gregory Adams
(74) *Attorney, Agent, or Firm* — Davidson, Davidson & Kappel, LLC

(57) ABSTRACT

The invention provides an apparatus and a method for economically forming packing unit layers. The apparatus comprises at least one supply conveyor, at least one further conveyor and an exit conveyor. Furthermore, at least one gripper for positioning and/or turning the packing units is associated with the further conveyor. The positioned and/or turned packing units are brought together to form form-fitting packing unit layers by a suitable device on the at least one exit conveyor. The at least one gripper is configured in such a way that is can be used to position and/or turn at least one packing unit and that at least one further packing unit can be placed on the positioned and/or turned packing unit in the same orientation.

14 Claims, 4 Drawing Sheets

APPARATUS AND METHOD FOR ECONOMICALLY FORMING LAYERS OF PACKING UNITS

This claims the benefit of German Patent Application No. DE 10 2008 050 395.9, filed on Oct. 2, 2008, and hereby incorporated by reference herein.

The present invention relates to an apparatus for economically forming packing unit layers. The apparatus comprises at least one supply conveyor for supplying the packing units. Furthermore, at least one further conveyor is provided downstream of the supply conveyor. At least one gripper for positioning and/or turning the packing units is associated with the further conveyor. Downstream of the further conveyor, at least one exit conveyor is arranged, on which the positioned and/or turned packing units can be grouped together to form form-fitting packing unit layers.

The method also relates to a method for economically forming packing unit layers.

BACKGROUND OF THE INVENTION

U.S. Pat. No. 3,587,876 discloses an apparatus for loading pallets. This apparatus is useful for supplying and turning by 90° individual packing units to the apparatus. The packing units are associated in fixed lanes with the gripper-like turning elements which then turn the packing units. The turning elements are only capable of turning one packing unit at a time. Subsequently the turned packing units are combined to form a layer by elements mounted at the side and then stacked on a pallet one layer after another.

In German Patent Application DE 102 19 129 A1, a method is described in which packs are turned and can be optionally distributed or combined. To handle the packs they are gripped by a gripper and turned by 90°. This gripper makes it possible to turn several packs serially supplied in a row in one go so that the packs are disposed side by side. Furthermore it is possible to turn simultaneously several packs arranged abreast so that the are arranged in a row after turning.

European Patent Application EP 1 046 598 A1 discloses an apparatus for creating layers of packing unit packages ready for palletising. In the apparatus according to the present invention, the supplied packing units are turned by 90° and/or offset on a conveyor belt by a plurality of grippers. These grippers are mounted on linear units arranged diagonally across the conveyor belt and parallel to each other. Each gripper is limited to a fixed working area by its installation on one of the linear units. After turning and/or positioning the packing units, they are a combined into packing unit layers.

European Patent EP 0 761 578 B1 discloses a method and an apparatus for combining packing unit layers and palletizing them. In a preferred manner, the sales units are supplied on two conveyors. The sales units are then picked up by two robots and combined into layers on a third conveyor. In a further working step, the layers are picked up and placed on a pallet layer after layer.

U.S. Patent Application No. 2005/0246056 A1 discloses an apparatus for positioning packing units and palletizing them. The packing units are supplied by a conveyor. A second conveyor is used to separate the packing units for subsequent processing steps. A gripper is used to turn the packing units and to position them on the conveyor according to a predetermined pattern for palletizing. Subsequently, the packing units are halted by a stop until the amount of packing units necessary for a packing unit layer is present. Then the packing unit layers are transferred to the pallet via a fixed plane by a pushing unit arranged above the conveyor. Further packing unit layers can be deposited by lowering the pallet. In a further embodiment, the packing units are supplied on two parallel conveyors. Then the packing units are combined into groups which are then turned and positioned in their entirety by the gripper. It is thus possible to handle a plurality of packing units simultaneously and to provide them for the formation of a packing unit layer.

European Patent EP 1 456 101 B1 discloses a method and an apparatus for the row formation of packing goods. The packing goods are supplied in a row (in an abutting relationship) to the apparatus. The packing goods are separated by means of two separating conveyor sections. Subsequently, the packing goods are turned by means of the turning conveyor sections. After turning, the packing goods are further transported via two row conveyor sections until they enter into the providing conveyor. Here, the packing goods are pushed together and pushed into the station for layer formation in a direction transverse to the old conveying direction. From the station for layer formation, the layers of packing goods are supplied to the palletizing station by the layer conveyor.

SUMMARY OF THE INVENTION

An object of the invention is to provide an apparatus for economically forming packing unit layers.

The present invention provides an apparatus comprising:
a. at least one supply conveyor for supplying the packing units;
b. at least one further conveyor, which is downstream of the supply conveyor;
c. at least one gripper being associated with the further conveyor and the at least one gripper is usable for positioning and/or turning the packing units, wherein the at least one gripper is configured in such a way that at least one packing unit is positionable and/or turnable, and on the positioned and/or turned packing unit at least one further packing unit is placeable in the same orientation, or that at least two packing units form a stack on top of each other in the same orientation, which is positionable and/or turnable;
d. at least one exit conveyor downstream of the further conveyor; and
e. means associated with the exit conveyor to form with the positioned and/or turned packing unit form-fitting layers of the packing units.

Another object of the present invention is to provide a method facilitating the economic formation of packing unit layers.

The present invention also provides a method comprising the steps of:

supplying in series the packing units to at least one further conveyor by means of at least one supply conveyor, positioning and/or turning at least one packing unit by at least one gripper on the further conveyor and placing at least one further packing unit in the same orientation on the positioned and/or turned packing unit, or stacking in a stack at least two packing units on top of each other in the same orientation and subsequently positioning and/or turning the stack with the at least one gripper, and associating with the further conveyor at least one exit conveyor, on which the positioned and/or turned packing units are brought together to form form-fitting layers of stacks of packing units by respective means.

The apparatus according to the present invention for economically forming packing unit layers includes at least one supply conveyor for supplying the packing units to the apparatus for economically forming packing unit layers. From the supply conveyor, the packing units are supplied to at least one further conveyor. At least one gripper for positioning and/or turning the packing units is associated with the at least one further conveyor.

The at least one gripper is configured in such a way that it can be used for positioning and/or turning at least one packing unit. The gripper is used to place at least one further packing unit on the positioned and/or turned packing unit in the same orientation. This means that the second packing unit is placed on the first positioned and/or turned packing unit in the same orientation on the first packing unit. In this way, the first and second packing units can form a stack in the same orientation after the second packing unit has been placed. A further embodiment may consist in configuring the gripper in such a way that it can position and or turn at least two packing units. For this purpose, the gripper is used to stack at least two packing units one above the other. The thus created stack is positioned and/or turned by the gripper in one go.

The positioned and/or turned packing units are further transported by at least one exit conveyor downstream of the further conveyor. On the exit conveyor, the positioned and/or turned packing units may be combined into form-fitting packing unit layers by various means. The exit conveyor comprises two portions, each consisting of at least one continuous conveyor, which can have various configurations. Continuous conveyors are well-known in many variants from the state of the art so that they need not be explained in any more detail.

The stacks of packing units may be combined into form-fitting packing unit layers in the transporting direction by a stop. This stop is arranged between the first portion of the exit conveyor and the second portion of the exit conveyor. The stop is for backing up the stacks of packing units exclusively in the transporting direction. This backing up of the stacks in the transporting direction results in the formation of at least two form-fitting packing unit layers, in which the form-fitting disposition is only in the transporting direction. To facilitate further transportation of the packing unit layers, the stop is retracted so that the packing unit layers can be transported to the second portion of the exit conveyor.

To obtain packing units ready for palletizing, it is advantageous to also form-fit them in a direction transverse to the transporting direction. For this purpose, a pair of pushers can be used, which is associated with the second portion of the exit conveyor parallel to the transporting direction. By mutually approaching the pair of pushers, the packing unit layers are now form-fitted also transverse to the transporting direction so that two packing unit layers are made ready for packing, wherein the packing units are in a completely form-fitting disposition within one packing unit layer.

In a special embodiment, the at least one gripper is configured in such a way that it can position and/or turn a packing unit which later is a component of a first packing unit layer. Subsequently, the gripper then places a further packing unit on the first positioned and/or turned packing unit. An important point is that the second packing unit which is placed on the first packing unit has the same orientation as the first packing unit so that a stack of two equally oriented packing units is formed.

A further embodiment of the at least one gripper consists in that the gripper is configured in such a way that it can grip at least two packing units at the same time and can thus position and/or turn a stack. For this purpose, the gripper places a second packing unit, which later is a part of the second packing unit layer, on a first packing unit, which is a part of the first packing unit layer in the same orientation as the first packing unit. Subsequently, the thus formed stack of two packing units is picked up by the at least one gripper and positioned and/or turned by it.

To be able to supply the at least two stacked and form-fitting packing unit layers to a palletizing machine, it is advantageous to provide at least one means to realize this. In an embodiment, this means can be associated with the second portion of the exit conveyor so that it can supply the packing unit layers to the palletizing machine, which is downstream of the second portion of the exit conveyor.

In a preferred embodiment the palletizing machine comprises at least one shutter-type head. This at least one shutter-type head is used to pick up the form-fitting packing unit layers formed on the exit conveyor and to place them on pallets.

A pusher is known from the state of the art as a means for supplying the packing unit layers to the shutter-type head. This pusher is used to completely push the form-fitting packing unit layers ready for palletizing, which have been combined on the exit conveyor, into the shutter-type head.

A second embodiment of the at least one means for supplying the packing unit layers is a bracket arranged at the shutter-type head. This bracket is used to completely push in and secure the packing unit layers which have been traversed into the shutter-type head. This is necessary because it is not possible to completely push the packing unit layers into the shutter-type head with the aid of the second portion of the exit conveyor. The front stacks of the packing unit layers are pushed into the shutter-type head by the stacks pushing from behind. The last stacks do not have subsequent stacks which are driven by the second portion of the exit conveyor. These last stacks are then pushed into the shutter-type head by the bracket. The pusher is dispensed with, which would otherwise push the packing unit layers completely into the shutter-type head.

BRIEF DESCRIPTION OF THE DRAWINGS

Exemplary embodiments will describe the apparatus for economically forming packing unit layers according to the present invention in more detail and its advantages with reference to the accompanying drawings, in which.

DETAILED DESCRIPTION

Figure 1:
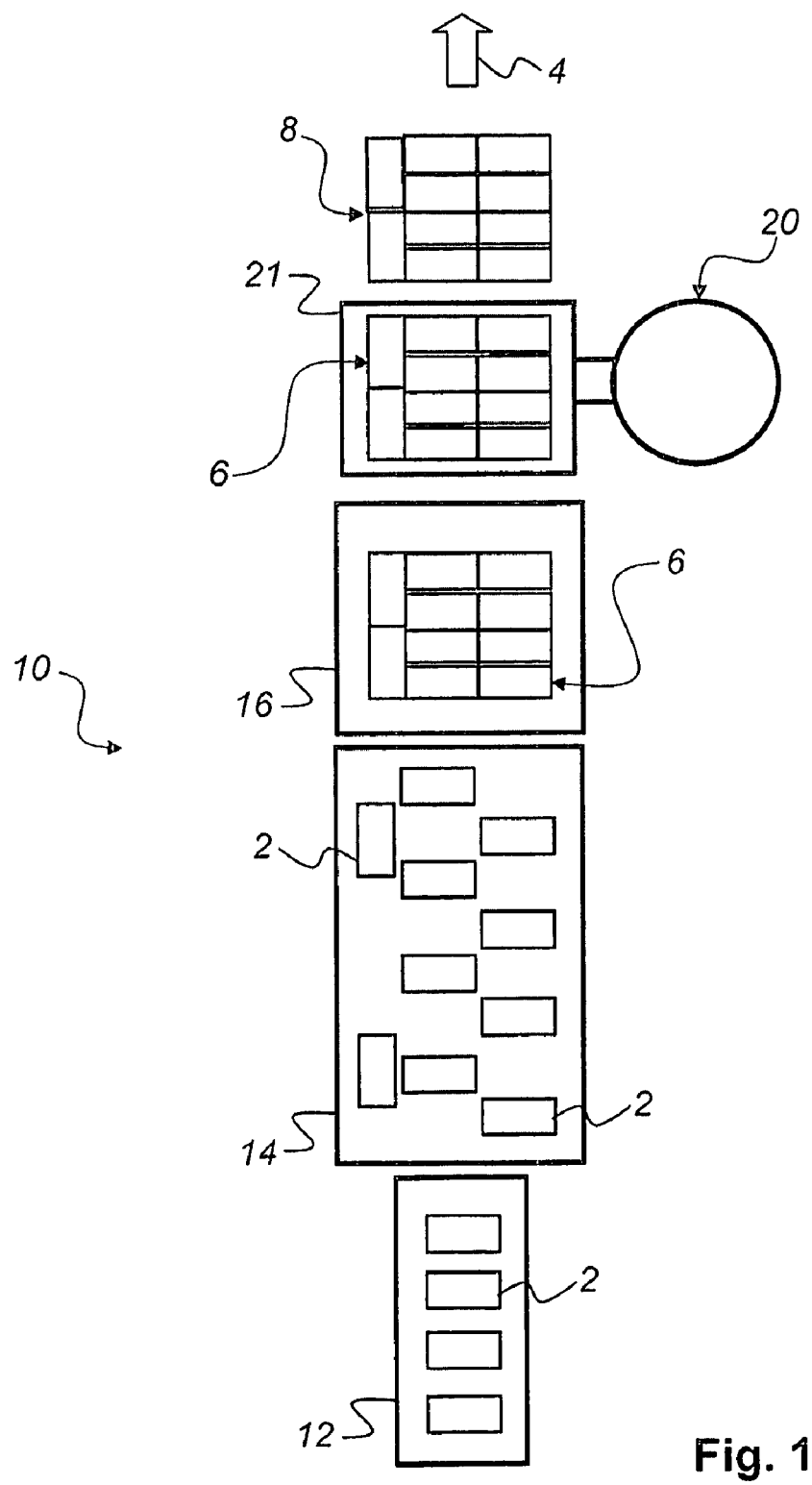
FIG. 1 is a schematic plan view of the structure of the apparatus for economically forming packing unit layers.

Identical reference numerals are used for the same or equivalent elements of the invention. Furthermore, only reference numerals are shown in the drawings which are necessary for the description of each figure for clarity.

FIG. 1 schematically shows the structure of apparatus 10 for economically forming packing unit layers 6 in a plan view. A supply conveyor 12 is used to supply packing units 2 to apparatus 10 in series to form packing unit layers 6. Downstream of supply conveyor 12 is a further conveyor 14, on which packing units 2 are positioned and/or turned. The positioned and/or turned packing units 2 are handed over by the further conveyor 14 to an exit conveyor 16, where they are combined to packing unit layers 6. Exit conveyor 16 hands over packing unit layers 6 in the transporting direction 4 to a palletizing machine 20 equipped with at least one shutter-type head 21 for palletizing packing unit layers 6.

Figure 2:
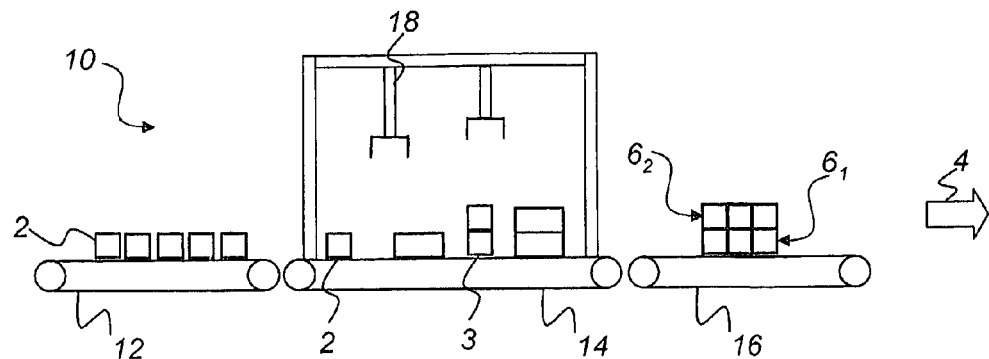
FIG. 2 is a schematic side view of the structure of a section of the apparatus for economically forming packing unit layers.

FIG. 2 schematically shows a side view of the structure of a section of apparatus 10 for economically forming packing unit layers 6. Packing units 2 are handed over in series to further conveyor 14 by supply conveyor 12. Packing units 2 are positioned and/or turned by at least one gripper 18 on further conveyor 14. Furthermore, the positioned and/or turned packing units 2 are stacked by at least one gripper 18 so that stacks 3 of two packing units 2 are formed. In the further process, stacks 3 are conveyed further in the transporting direction 4 and handed over to exit conveyor 16. Form-fitting packing unit layers $6_1$ and $6_2$ are created from stacks 3 on exit conveyor 16.

Figure 3:
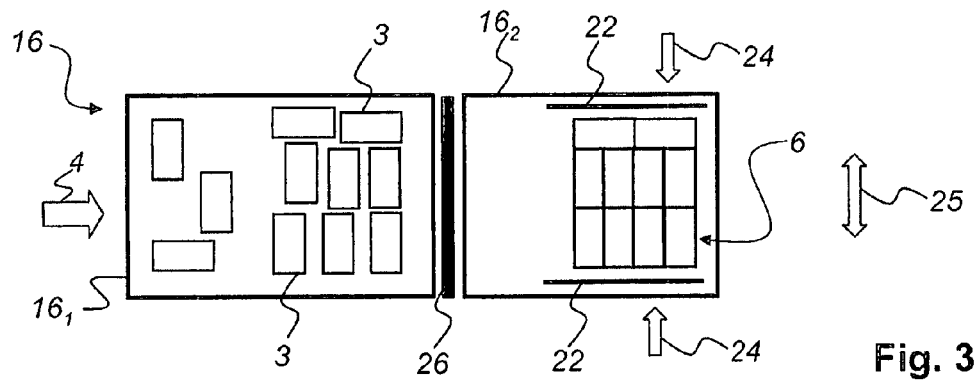
FIG. 3 is a schematic plan view of how packing unit layers are created from the stacks on the exit conveyor.

FIG. 3 is a schematic plan view of how packing unit layers 6 are created from stacks 3 on exit conveyor 16. In the first portion of exit conveyor $16_1$, stacks 3 are conveyed against a stop 26 in the transporting direction 4. Stacks 3 are backed up by stop 26 in such a way that they are brought together in form-fitting packing unit layers in the transporting direction 4. On the second portion of exit conveyor $16_2$, packing unit layers 6 form-fitted in the transporting direction 4 are brought together in a form-fitting manner in a transverse direction 25 with respect to the transporting direction 4 by a pair of pushers 22. For this purpose, the pair of pushers 22 is moved in the pushing direction 24 so that there is a form-fitting disposition within the packing unit layers 6 both in the transporting direction 4 and transverse to the transporting direction 4.

Figure 4:
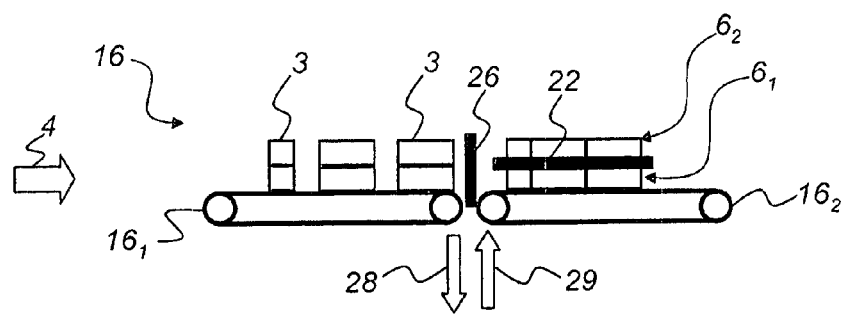
FIG. 4 is a schematic side view of how packing unit layers are created from the stacks on the exit conveyor.

FIG. 4 is a schematic side view of how packing unit layers 6 are created from stacks 3 on exit conveyor 16. Stacks 3 are backed up by stop 26 in the first portion of exit conveyor 16, in such a way that they are brought together in form-fitting packing unit layers $6_1$ and $6_2$ in the transporting direction 4. Stop 26 is retracted in the direction of arrow 28 between the two portions of exit conveyor 16 so that packing unit layers $6_1$ and $6_2$ can be handed over to the second portion of exit conveyor $16_2$. After packing unit layers $6_1$ and $6_2$ have been handed over to the second portion of exit conveyor $16_2$, stop 26 is returned to the extended position in the direction of arrow 29 so that further packing unit layers $6_1$ and $6_2$ supplied by the first portion of exit conveyor 16a can be backed up. Packing unit layers $6_1$ and $6_2$ form-fitted in the transporting direction 4 are brought together in form-fitting form in the direction transverse to the transporting direction 4 by the pair of pushers 22 on the second portion of exit conveyor $16_2$.

Figure 5:
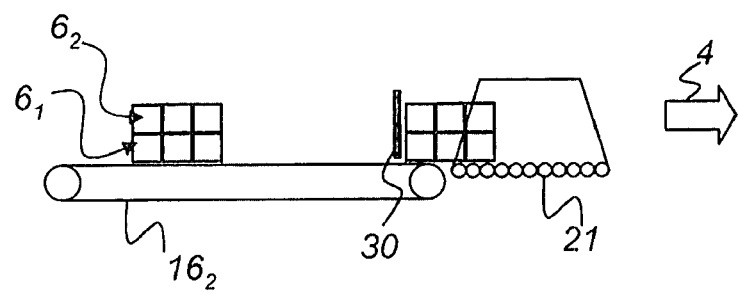
FIG. 5 is a schematic view of how the packing unit layers are transferred into the shutter-type head by the pusher.

FIG. 5 is a schematic view of how packing unit layers $6_1$ and $6_2$ are transferred into shutter-type head 21 by pusher 30. The transfer is carried out in such a way that pusher 30 pushes packing unit layers $6_1$ and $6_2$ into shutter-type head 21 in the transporting direction 4. After packing unit layers $6_1$ and $6_2$ have been pushed into shutter-type head 21, pusher 30 is returned over the second portion of exit conveyor $16_2$ so that packing unit layers $6_1$ and $6_2$ subsequently supplied by the second portion of exit conveyor $16_2$ can be pushed into shutter-type head 21.

Figure 6:
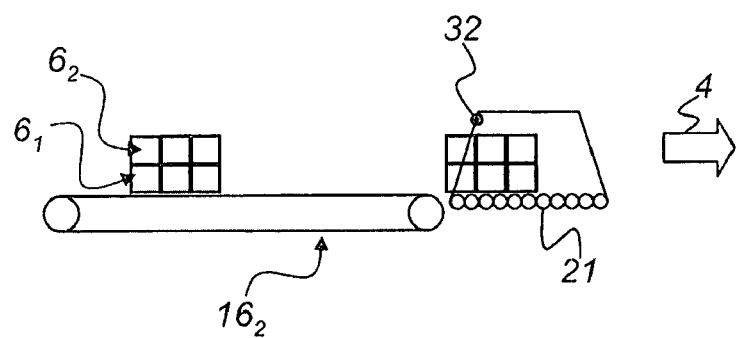
FIG. 6 is a schematic view of how the packing unit layers are transferred into the shutter-type head by the bracket.

FIG. 6 schematically shows how packing unit layers $6_1$ and $6_2$ are transferred into shutter-type head 21 by bracket 32. In this embodiment, packing unit layers $6_1$ and $6_2$ are pushed, as already described in FIG. 5, into shutter-type head 21 by the second portion of exit conveyor $16_2$. The last stack 3 of packing unit layers $6_1$ and $6_2$ cannot be completely pushed into shutter-type head 21 by the second portion of exit conveyor $16_2$, since the second portion of exit conveyor $16_2$ does not quite reach into shutter-type head 21. In order to completely push packing unit layers $6_1$ and $6_2$ in, bracket 32 is lowered and completely pushes packing unit layers $6_1$ and $6_2$ into shutter-type head 21. Furthermore, bracket 32 is used to secure packing unit layers $6_1$ and $6_2$ within shutter-type head 21.

Figure 7:
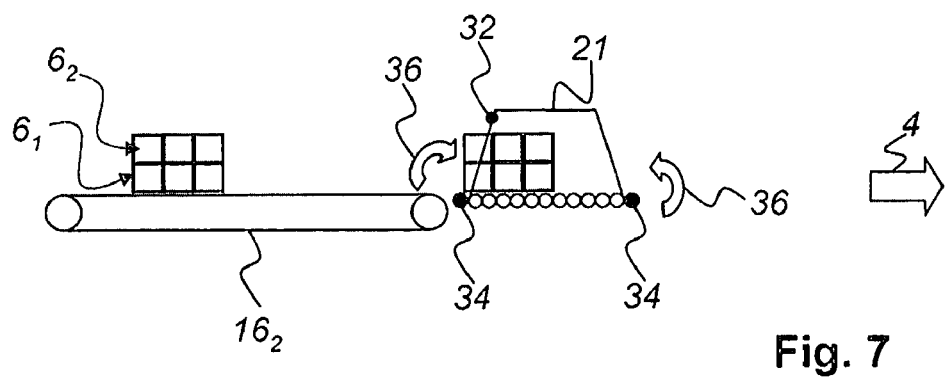
FIG. 7 is a schematic view of how the packing unit layers are transferred into the shutter-type head by the bracket and additional loading rollers.

FIG. 7 schematically shows how packing unit layers $6_1$ and $6_2$ are transferred into shutter-type head 21 by bracket 32 and additional loading rollers 34. In this embodiment, packing unit layers $6_1$ and $6_2$ are pushed into shutter-type head 21 by driven loading roller 34. Bracket 32 moves packing unit layers $6_1$ and $6_2$ into shutter-type head 21 as described in FIG. 6.

Figure 8:
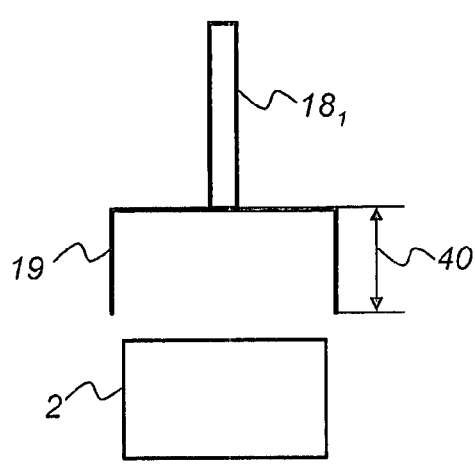
FIG. 8 is a schematic view of the structure of the gripper for taking up a packing unit.

FIG. 8 schematically shows the structure of a gripper $18_1$ for picking up a packing unit 2. This gripper $18_1$ is capable of picking up one packing unit 2 at a time. This is made possible by length 40 of gripping tools 19.

Figure 9:
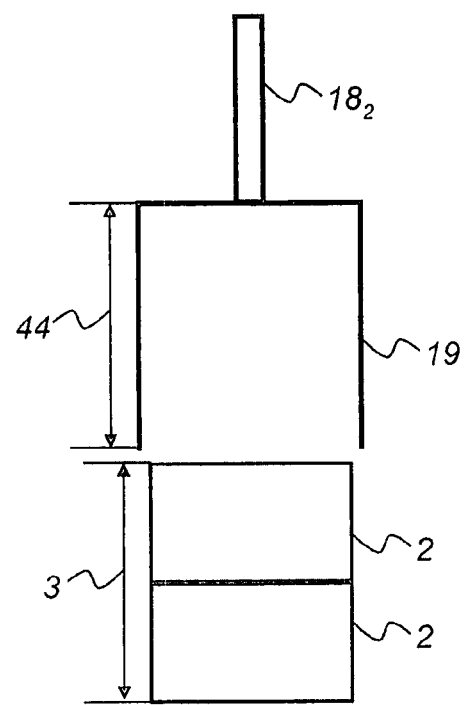
FIG. 9 is a schematic view of the structure of the gripper for taking up two packing units.

FIG. 9 schematically shows the structure of a gripper $18_2$ for picking up a stack 3 of two packing units 2. Herein, length 44 of gripping tools 19 of gripper $18_2$ is configured in such a way that it can pick up a stack 3 of at least two packing units 2.

The invention has been described with reference to a preferred embodiment. It goes without saying for a person skilled in the art that changes and modifications can be made without leaving the scope of protection of the appended claims.

What is claimed is:

1. An apparatus for forming layers of packing units comprising:
    at least one supply conveyor for supplying the packing units;
    at least one further conveyor downstream of the supply conveyor;
    at least one gripper associated with the further conveyor, the at least one gripper being usable for positioning the packing units, wherein the at least one gripper is configured in such a way that at least one packing unit is positionable, and on the positioned packing unit at least one further packing unit is placeable in the same orientation;
    at least one exit conveyor downstream of the further conveyor; and
    means associated with the exit conveyor to form with the positioned packing units form-fitting layers of the packing units;
    wherein the at least one gripper positions a packing unit, which is part of a first layer of packing units and in that the gripper places a further packing unit in the same orientation on the positioned packing unit and thus forms a stack of two packing units.

2. The apparatus as defined in claim 1 wherein the means includes a stop between a first portion of the exit conveyor and a second portion of the exit conveyor, so that the packing units form at least two form-fitting layers of stacks of packing units in a transporting direction of the exit conveyor.

3. The apparatus as defined in claim 2 wherein the means further includes a pair of pushers associated with the second portion of the exit conveyor parallel to the transporting direction of the exit conveyor, so that the packing units form at least two form-fitting layers of stacks of packing units in a transporting direction transverse to the transporting direction of the exit conveyor.

4. The apparatus as defined in claim 2 wherein at least one further means are provided for supplying the at least two stacked and form-fitting layers of packing unit of stacks to a palletizer associated with the second portion of the exit conveyor, wherein the palletizer is arranged downstream of the second portion of the exit conveyor.

5. The apparatus as defined in claim 4 wherein the palletizer comprises at least one shutter gripper head.

6. The apparatus as defined in claim 4 wherein that the at least one further means for supplying is a pusher.

7. The apparatus as defined in claim 4, wherein the at least one further means for supplying is a bracket arranged at the shutter gripper head.

8. An apparatus for forming layers of packing units comprising:
at least one supply conveyor for supplying the packing units;
at least one further conveyor downstream of the supply conveyor;
at least one gripper associated with the further conveyor, the at least one gripper being usable for positioning the packing units, wherein the at least one gripper is configured in such a way that at least one packing unit is positionable, and on the positioned packing unit at least one further packing unit is placeable in the same orientation;
at least one exit conveyor downstream of the further conveyor; and
means associated with the exit conveyor to form with the positioned packing units form-fitting layers of the packing units;
wherein the at least one gripper places a second packing unit, which is part of a second layer of packing units, on a first packing unit in the same orientation, which is part of a first layer of packing units, and the stack is positioned by the at least one gripper.

9. An apparatus for forming layers of packing units comprising:
at least one supply conveyor for supplying the packing units;
at least one further conveyor downstream of the supply conveyor;
at least one gripper associated with the further conveyor, the at least one gripper being usable for positioning the packing units, wherein the at least one gripper is configured in such a way that at least one packing unit is positionable, and on the positioned packing unit at least one further packing unit is placeable in the same orientation;
at least one exit conveyor downstream of the further conveyor; and
a layer former associated with the exit conveyor to form with the positioned packing units form-fitting layers of the packing units;
wherein the at least one gripper positions a packing unit, which is part of a first layer of packing units and in that the gripper places a further packing unit in the same orientation on the positioned packing unit and thus forms a stack of two packing units.

10. A method for economically forming packing unit layers, comprising the steps of:
supplying in series the packing units to at least one further conveyor using at least one supply conveyor,
positioning at least one packing unit by at least one gripper on the further conveyor and placing at least one further packing unit in the same orientation on the positioned packing unit, and
associating with the further conveyor at least one exit conveyor, on which the positioned packing units are brought together by a device to form form-fitting layers of stacks of packing units,
wherein the at least one gripper is used to position a packing unit, which is a part of a first layer of packing units, and in that only one further packing unit is placed on the positioned packing unit in the same orientation by the gripper to thus form a stack of the two packing units.

11. The method as defined in claim 10 wherein the device includes a stop arranged between a first portion of the exit conveyor and a second portion of the exit conveyor, by which the packing units are backed up in such a way that at least two form-fitting layers of packing unit are formed of stacks only in the transporting direction.

12. The method as defined in claim 11 wherein the device includes a pair of pushers, associated with the second portion of the exit conveyor parallel to the transporting direction, is used to bring together the packing units in the transporting direction and transverse to the transporting direction to form at least two form-fitting layers of stacks of packing units.

13. The method as defined in claim 10 wherein the layers of packing units of stacks are supplied to at least one palletizer by the at least one exit conveyor.

14. A method for economically forming packing unit layers, comprising the steps of:
supplying in series the packing units to at least one further conveyor using at least one supply conveyor,
positioning at least one packing unit by at least one gripper on the further conveyor and placing at least one further packing unit in the same orientation on the positioned packing unit, and
associating with the further conveyor at least one exit conveyor, on which the positioned packing units are brought together by a device to form form-fitting layers of stacks of packing units;
wherein the at least one gripper is used to place a second packing unit, which is a part of a second layer of packing units, on a first packing unit in the same orientation, wherein the first packing unit is a part of a first layer of packing units, and in that the stack is positioned by the at least one gripper.

* * * * *